(12) United States Patent
Kono et al.

(10) Patent No.: US 6,417,264 B1
(45) Date of Patent: Jul. 9, 2002

(54) CATIONIC POLYMER-MODIFIED SILICA DISPERSION AND PRODUCTION PROCESS FOR THE SAME

(75) Inventors: Hiroyuki Kono, Shiki; Kenji Fukunaga, Shinnanyo; Kenichi Ishizu, Tokuyama; Yoshinori Tagashira, Shinnanyo, all of (JP)

(73) Assignee: Tokuyama Corporation, Yamaguchi-ken (JP)

( * ) Notice: Subject to any disclaimer, the term of this patent is extended or adjusted under 35 U.S.C. 154(b) by 0 days.

(21) Appl. No.: 09/468,834

(22) Filed: Dec. 22, 1999

(30) Foreign Application Priority Data

Dec. 24, 1998 (JP) ............................................. 10-367515

(51) Int. Cl.⁷ ................................................. C08L 3/34
(52) U.S. Cl. ......................... 524/493; 524/460; 516/87
(58) Field of Search .............................. 524/492, 493, 524/460; 516/81, 64, 86, 87

(56) References Cited

U.S. PATENT DOCUMENTS

| 4,795,531 | A | * | 1/1989 | Sofia et al. | ............... | 162/164.6 |
| 4,863,615 | A | * | 9/1989 | Stenger et al. | ............... | 210/712 |
| 4,929,382 | A | * | 5/1990 | Stenger et al. | ............... | 252/181 |
| 5,004,550 | A | * | 4/1991 | Beckman et al. | ........... | 210/710 |
| 5,667,697 | A | * | 9/1997 | Salmen et al. | ............... | 210/727 |
| 5,840,158 | A | * | 11/1998 | Choo et al. | ............... | 162/164.3 |
| 5,904,159 | A | * | 5/1999 | Kato et al. | ....................... | 134/7 |
| 5,967,964 | A | * | 10/1999 | Hattori et al. | ................. | 516/81 |

FOREIGN PATENT DOCUMENTS

| EP | 0 529 308 | 3/1993 |
| EP | 0 773 270 | 5/1997 |
| EP | 0 876 841 | 11/1998 |
| EP | 0 882 673 | 12/1998 |
| JP | 4-19037 | 3/1992 |
| JP | 5-57114 | 8/1993 |

* cited by examiner

*Primary Examiner*—Edward J. Cain
*Assistant Examiner*—Katarzyna W. Lee
(74) *Attorney, Agent, or Firm*—Wenderoth, Lind & Ponack, L.L.P.

(57) ABSTRACT

Provided is a cationic polymer-modified silica dispersion which comprises silica fine particles having an average particle diameter of less than 200 nm and a cationic polymer and which does not bring about coagulation of the silica particles. The above dispersion which is diluted to a solid concentration of 1.5% by weight is characterized by having a light scattering index (n value) of 2.0 or more. The above dispersion can be produced by oppositely-colliding a mixed solution obtained by mixing silica with a cationic polymer in a polar solvent at a treating pressure of 300 kgf/cm² or more or passing it through an orifice under a condition that a pressure difference between the inlet side and the outlet side of the orifice is 300 kgf cm² or more.

20 Claims, No Drawings

CATIONIC POLYMER-MODIFIED SILICA DISPERSION AND PRODUCTION PROCESS FOR THE SAME

FIELD OF THE INVENTION

The present invention relates to a cationic polymer-modified silica dispersion and a production process for the same. More specifically, the present invention provides a novel cationic polymer-modified silica dispersion which is useful as a raw material for a coating liquid for an ink jet recording sheet, and a production process for the same.

DESCRIPTION OF THE PRIOR ART

A silica dispersion has so far been used for a raw material for a coating liquid for an ink-jet recording sheet, and a silica dispersion in which a cationic reagent is compounded has so far been used in order to enhance an optical density and a water resistance of an ink-jet recording sheet.

Cation-modified colloidal silica covered with a compound of polyvalent metal ion such as an aluminum ion is proposed in Japanese Patent Publication 19037/1992 as a silica dispersion used as the preceding coating liquid for an ink-jet recording sheet, and proposed in Japanese Patent Publication 57114/1993 is a composition prepared by blending synthetic silica having an average coagulated particle diameter of 0.5 to 30 μm with a cationic polymer containing a quaternary ammonium group.

However, an ink-jet recording sheet coated with a coating liquid using silica which is described in Japanese Patent Publication 19037/1992 has the defect that the performances such as a water resistance and a color developing property are not satisfactory. Further, an ink-jet recording sheet coated with the coating liquid using a composition described in Japanese Patent Publication 57114/1993 is improved in a water resistance and a color developing property but has the defect that the surface flatness and the glossiness are low due to large silica particles.

Accordingly, in order to solve the problems described above, a cation-modified silica dispersion comprising silica particles having an average particle diameter of less than 200 nm and a cationic polymer is investigated. In the present invention, an average particle diameter means a volume-based intermediate diameter $D_{50}$ determined by means of a light scattering diffraction type particle size distribution meter.

PROBLEMS TO BE SOLVED BY THE INVENTION

In general, however, there has been the problem that if a cationic polymer is mixed with a silica dispersion in which silica fine particles having an average particle diameter of less than 200 nm are dispersed, the silica particles are coagulated and not turned back to an original dispersion state even by redispersing them by means of a conventional disperser such as a turbine stator type high-speed rotary stirring disperser (for example, a homogenizer and the like), a colloid mill and a supersonic emulsifier.

An increase in the average particle diameter of silica due to coagulation of the silica particles described above brings about the problem that not only a flatness on the surface of the coated layer is not obtained but also light is prevented from transmitting, so that the coated layer is turned opaque and the glossiness comes short.

Accordingly, an object of the present invention is to provide a cationic polymer-modified silica dispersion which does not cause such coagulation of silica particles as described above and which comprises silica fine particles having an average particle diameter of less than 200 nm and a cationic polymer, and a process for producing the same.

MEANS TO SOLVE THE PROBLEMS

Intensive researches continued by the present inventors regarding the problems described above have resulted in finding that a mixed solution obtained by mixing silica fine particles having an average particle diameter of less than 200 nm with a cationic polymer in a polar solvent is oppositely-collided at a treating pressure of 300 kgf/cm$^2$ or more or passed through an orifice under a condition that a pressure difference between the inlet side and the outlet side of the orifice is 300 kgf/cm$^2$ or more, whereby the silica dispersion which is redispersed to an original dispersion state can be obtained again.

Thus, according to the present invention, provided is a cationic polymer-modified silica dispersion in which silica and a cationic polymer are dispersed in a polar solvent, wherein the silica particles contained in the above dispersion have an average particle diameter of less than 200 nm, and the above dispersion which is diluted to a solid concentration of 1.5% by weight has a light scattering index (n value) of 2.0 or more.

EMBODIMENTS OF THE INVENTION

The silica used in the present invention shall not specifically be restricted. Accordingly, publicly known silicas such as wet processed silica, dry processed silica, sol-gel processed silica and the like can be used as a raw material in the present invention.

Precipitation processed silica formed by neutralizing sodium silicate with a mineral acid to deposit silica in a solution is representative of wet processed silica described above, and it is called "white carbon" as well. Also, gel process silica prepared by neutralizing sodium silicate with an acid in the same manner can be used as well. Further, a dewatered silica cake which is only filtered and washed after a neutralization reaction and is not subjected to a drying step can be used as well.

In general, dry processed silica described above is obtained by burning silicon tetrachloride in oxygen-hydrogen flame at a high temperature and called fumed silica.

The sol-gel processed silica described above can be obtained usually by hydrolyzing an alkoxide of silicon such as tetraethoxysilane and tetraethoxysilane in an acidic or alkaline water-containing organic solvent.

In the present invention, wet processed silica and dry processed silica out of the silicas described above are suited.

In the present invention, any polymers can be used as the cationic polymer without specific restrictions as long as they are dissociated when they are dissolved in water to present a cationic property. Among them, the polymers having a primary to tertiary amine or a quaternary ammonium salt can suitably used, and the polymers having a quaternary ammonium salt are more suitable.

The polar solvent used in the present invention shall not specifically be restricted as long as it is a polar solvent in which silica and a cationic polymer are easily dispersed. Examples which can be give as such polar solvent include water; alcohols such as methanol, ethanol and isopropyl alcohol; ethers; and ketones. Among the polar solvents described above, water is suited. Further, mixed solvents of water and the polar solvents described above can be used as well.

In order to elevate the stability and the dispersibility of the silica particles, a small amount of a surfactant and the like may be added to the cationic polymer-modified silica dispersion of the present invention as long as the effects of the present invention are not damaged.

In the present invention, the amounts of silica and the cationic polymer contained in the cationic polymer-modified silica dispersion shall not specifically be restricted. The amount of silica contained in the silica dispersion is preferably 8 to 50% by weight, more preferably 8 to 25% by weight, and the amount of the cationic polymer is preferably 3 to 50 parts by weight per 100 parts by weight of the silica.

If the amount of silica contained in the silica dispersion is more than 50% by weight, a fluidity of the slurry is extremely deteriorated, so that it is difficult to mix it with the cationic polymer. On the other hand, if the amount is smaller than 8% by weight, a large apparatus for drying the dispersion is required, so that the energy cost grows high.

If the amount of the cationic polymer contained in the silica dispersion is smaller than 3 parts by weight per 100 parts by weight of the silica, a balance of the surface charge of the silica particles becomes uneven, and the silica particles are liable to cause firm coagulation. On the other hand, if the amount of the cationic polymer is more than 50 parts by weight per 100 parts by weight of the silica, the viscosity grows high, so that dispersion treatment becomes difficult.

The silica particles in the cationic polymer-modified silica dispersion of the present invention have to have a zeta potential, which is a barometer for a surface charge, of +10 mV or more, preferably +20 mV or more and more preferably +30 mV or more. The higher zeta potential is more effective for a water resistance of an ink jet sheet. The more the mixed amount of the cationic polymer is increased, the higher the zeta potential grows, but the rise range thereof is varied depending on the kind of the cationic polymer mixed.

In the cationic polymer-modified silica dispersion of the present invention, the silica particles contained in the above dispersion have to have an average particle diameter of less than 200 nm, and the above dispersion which is diluted to a solid concentration of 1.5% by weight has to have a light scattering index (n value) of 2.0 or more. If the average particle diameter of silica is larger than 200 nm and the n value is smaller than 2.0, brought about is the problem that when it is used as a raw material for a coating liquid for an ink jet sheet, not only a flatness on the surface of the coated layer is not obtained but also light is prevented from transmitting, so that the coated layer is turned opaque and the glossiness comes short, resulting in insufficient optical density.

The light scattering index (n value) described above is a barometer for a dispersion state of silica in the dispersion, and as the dispersibility is elevated, this value grows larger.

The n value is determined according to a method described in Journal of Ceramic Society of Japan, vol. 101 [6], pp. 707 to 712 (1993).

That is, the spectrum of a silica dispersion in a wavelength ($\lambda$) of light falling in a range of 460 to 700 nm is measured by means of a commercial spectrophotometer to thereby determine the absorbance $\tau$, and log ($\lambda$) and log ($\tau$) are plotted to determine the gradient ($-n$) of the straight line according to a least square method using the following equation (1):

$$\tau = \alpha \lambda^{-n} \quad (1)$$

wherein $\tau$ represents an absorbance; $\alpha$ represents a constant; $\lambda$ represents a wavelength of light; and n represents a light scattering index. Theoretically, the value which can be represented by n is 4 or less.

To show specifically the measuring conditions described above, first of all, a cell having an optical path length of 10 mm is used, and a control cell and a sample cell are filled with deionized water respectively to carry out zero point correction over a wavelength range of 460 to 700 nm. Then, the dispersion is diluted with deionized water so that a solid concentration of the dispersion is 1.5% by weight, and the sample cell is charged with the above diluted dispersion to measure the absorbance ($\tau$) in a wavelength ($\lambda$) falling in a range of 460 to 700 nm.

In the present invention, a process for producing the cationic polymer-modified silica dispersion shall not specifically be restricted. However, the suitable production process includes, for example, a method comprising oppositely-colliding a mixed solution obtained by mixing silica with the cationic polymer in a polar solvent at a treating pressure of 300 kgf/cm$^2$ or more or passing it through an orifice under a condition that a pressure difference between the inlet side and the outlet side of the orifice is 300 kgf/cm$^2$ or more.

A production process for the preceding mixed solution of silica and the cationic polymer shall not specifically be restricted and includes a method in which silica is simply mixed with the cationic polymer in a polar solvent, a method in which the cationic polymer is mixed with a silica dispersion obtained by dispersing silica in advance in a polar solvent by means of a conventional disperser such as a turbine stator type high-speed rotary stirring disperser (for example, a homogenizer and the like), a colloid mill and a supersonic emulsifier, and a method in which a mixture of silica and the cationic polymer is treated in a polar solvent by means of the conventional disperser described above.

A form of the preceding silica used in the production process of the present invention shall not specifically be restricted and may be any one of a powder, a cake, a slurry and a dispersion.

Among them, a silica slurry or a silica dispersion obtained by dispersing a powder, a cake or the like in advance in a liquid medium is suitable, and a silica dispersion is particularly suitable.

Taking efficient dispersion and pulverization into consideration, a dewatered silica cake of wet processed silica which is only filtered and washed after a neutralization reaction and is not subjected to a drying step is suited as a raw material for the silica slurry or silica dispersion described above. Also, from a viewpoint of a rise in a dispersibility of the resulting cationic polymer-modified silica dispersion, a dry processed silica powder is suited.

The silica dispersion includes pulverized silica dispersions, and among them, a pulverized silica dispersion having an average particle diameter of less than 200 nm is suitable taking the effects of the present invention into consideration. To be specific, included is a pulverized silica dispersion obtained by pulverizing to an average particle diameter of less than 200 nm, a silica slurry in which various kinds of silicas are dispersed in a polar solvent by a method described in Japanese Patent Application Laid-Open No. 142827/1997.

In particular, the silica dispersion obtained by the method described in the gazette described above is composed of coagulated particles into which several to several ten primary particles are coagulated, so that it has an excellent liquid-absorbing property and can suitably be used in the fields of an ink jet recording sheet and the like.

Pulverization described above means not only pulverization of silica particles comprising strong coagulated particles but also cracking and dispersion in which coagulation of silica particles comprising loose coagulated particles is unfastened.

In the present invention, the silica slurry means one in which almost all silicas are precipitated when they are dispersed in a liquid medium and then left standing, and the silica dispersion means one in which silicas are scarcely precipitated when they are dispersed in a liquid medium and then left standing.

When the silica slurry or silica dispersion described above is used, a silica concentration in the above silica slurry or silica dispersion before mixed with the cationic polymer has to be 50% by weight or less, preferably 30% by weight or less and more preferably 20% by weight or less. If it exceeds 50% by weight, the fluidity shall be extremely deteriorated, and therefore it shall become difficult to mix with the resin.

In the present invention, a commercial apparatus generally called a high-pressure homogenizer is suitably used as an apparatus for oppositely-colliding a mixed solution obtained by mixing silica with the cationic polymer in a polar solvent at a treating pressure of 300 kgf/cm$^2$ or more or passing it through an orifice under a condition that a pressure difference between the inlet side and the outlet side of the orifice is 300 kgf/cm$^2$ or more. Specific examples which can be given as typical examples of the high-pressure homogenizer include brand name: Nanomizer(r), manufactured by Nanomizer, Inc., brand name: Microfuidizer(r), manufactured by Microfuidics Corporation and Ultimizer (r), manufactured by Sugino Machine Ltd.

The orifice described above means a mechanism in which a thin plate (orifice plate) having fine circular holes is inserted into a straight pipe to narrow abruptly a passage of the straight pipe.

The high-pressure homogenizer described above is an apparatus comprising fundamentally a high pressure-generating member for applying pressure to a raw material slurry and an oppositely-colliding member or an orifice member. In general, a high pressure pump called a plunger pump is suitably used as the high pressure-generating member. The high pressure pump includes various types such as a single type, a double type and a triple type, and any type can be used without limitations in the present invention.

In the present invention, a treating pressure applied when the mixed solution obtained by mixing silica with the cationic polymer in a polar solvent is oppositely-collided and a pressure difference between the inlet side and the outlet side of an orifice when it is passed through an orifice are 300 kgf/cm$^2$ or more, preferably 800 kgf/cm$^2$ or more and more preferably 1200 kgf/cm$^2$ or more in either case.

A collision velocity of the above mixed solution when oppositely-collided is 50 m/second or more, preferably 100 m/second or more and more preferably 150 m/second or more in terms of a relative velocity.

A linear velocity of the polar solvent when passing through the orifice can not absolutely be determined since it depends on a pore diameter of the orifice used, but it is 50 m/second or more, preferably 100 m/second or more and more preferably 150 m/second or more as is the case with the preceding collision velocity when oppositely-collided.

In any method, the dispersion efficiency depends on the treating pressure, and therefore the higher the treating pressure is, the more the dispersion efficiency is elevated. However, the treating pressure exceeding 3500 kgf/cm$^2$ is liable to bring about problems on a pressure resistance of pipelines of the high pressure pump and a durability of the apparatus.

In any method described above, the treating cycle shall not specifically be restricted and may suitably be determined so that the silica dispersion prescribed in the present invention can be obtained. Usually, it is selected from a range of once to some ten times.

EXAMPLES

The present invention shall specifically be explained below with reference to reference examples, examples and comparative examples, but the present invention shall by no means be restricted by these examples.

Various measurements of the silica dispersions were carried out in the following manners.

Measurement of Average Particle Diameter

A light scattering diffraction type particle size distribution measuring meter (Coulter LS-230 manufactured by Coulter Co., Ltd.) was used to determine the volume-based intermediate diameter $D_{50}$, and this value was adopted as the average particle diameter. In measuring it, a refraction index of 1.332 of water (dispersion medium) and a refraction index of 1.458 of silica were input as parameters.

Measurement of Viscosity

The silica dispersion of 300 g was put in a 500 ml vessel and stirred at 20000 rpm for 5 minutes by means of a homogenizer (Ultra-Turrax T-25 manufactured by Ika Co., Ltd.). Next, the vessel was dipped in a constant temperature bath of 30° C. for 10 minutes, and then the viscosity was measured on a condition of 60 rpm by means of a B type viscometer (BL manufactured by Tokimec, Inc.).

Measurement of n Value and Transmission Factor

A visible ray absorption spectrum of the silica dispersion was determined by means of a spectrophotometer (Ubest-35 type manufactured by Nippon Bunko Co., Ltd.). First, a cell having an optical path length of 10 mm was used, and a control cell and a sample cell were filled with deionized water respectively to carry out zero point correction over the whole wavelength range. Then, the silica dispersion was diluted with deionized water so that a solid concentration of the dispersion became 1.5% by weight, and the sample cell was charged with the above diluted dispersion to measure the absorbance ($\tau$) in a wavelength ($\lambda$) falling in a range of 460 to 700 nm, the measurement of which was repeated 241 times by 1 nm. Plotted were log ($\lambda$) and log ($\tau$) to determine the gradient (−n) of the straight line according to a least square method using the equation (1) described above. The value n thus determined was set as a light scattering index.

Further, the transmission factor (T) was calculated form the absorbance ($\tau$) in a wavelength of 589 nm (NaD ray) according to the following equation (2):

$$T(\%) = 10^{(2-\tau)} \qquad (2)$$

Measurement of Zeta Potential

A zeta potential of the silica particles contained in the silica dispersion was measured by means of a laser zeta electrometer (LEZA-600 manufactured by Otsuka Electron Co., Ltd.). First, the above dispersion was diluted with an NaCl aqueous solution of 10 ppm so that a concentration of silica contained in the silica dispersion became 300 ppm, and it was then subjected to dispersing treatment for 5 minutes in a supersonic bath. Next, a measuring cell was charged with the above diluted dispersion to measure the zeta potential on the conditions of an applied voltage of 80 V, a measuring angle of 20° and a measuring temperature of 25° C.

Reference Example (Preparation of Pulverized Silica Dispersion Before Mixed with the Cationic Polymer)

A reactor was charged with commercial sodium silicate and demineralized water so that a solution having a sodium silicate concentration of 5% was prepared. This solution was heated up to 40° C. and neutralized to a neutralization rate of 50% with 22 wt % sulfuric acid, and then the reaction liquid was heated to a temperature of 95° C. Sulfuric acid described above was added to this reaction liquid until the neutralization rate came up to 100%. Resulting silica was repeatedly subjected to filtration and washing operations to obtain a dewatered cake (silica content: 15 wt %). Silica obtained by drying this dewatered cake had a specific surface area of 280 m$^2$/g.

Added to 2000 g of the dewatered cake described above was 500 g of demineralized water, and preliminary mixing was carried out by stirring by means of a propeller mixer to obtain a silica slurry. The resulting pasty silica slurry was passed through an orifice three times at a treating pressure of 800 kgf/cm$^2$ by means of a high pressure homogenizer (Nanomizer LA-31 manufactured by Nanomizer, Inc.) to obtain a pulverized silica dispersion. Hereinafter, this is called a pulverized silica dispersion (A). The analytical result thereof is shown in Table 1.

Example 1

Added to 1000 g of the pulverized silica dispersion (A) was 48 g of a diallyldimethylammonium chloride-acrylamide copolymer aqueous solution having a concentration of 25 wt % as a cationic polymer, and the dispersion was stirred by means of a propeller mixer to thereby obtain a preliminary mixed liquid. The resulting preliminary mixed liquid was passed through an orifice twice at a treating pressure of 800 kgf/cm$^2$ by means of the high pressure homogenizer (Nanomizer LA-31 manufactured by Nanomizer, Inc.), whereby a cationic polymer-modified silica dispersion was obtained. The measurement result of this dispersion is shown in Table 1.

Example 2

A cationic polymer-modified silica dispersion was obtained in the same manner as in Example 1, except that the preliminary mixed liquid was oppositely-collided twice at a treating pressure of 800 kgf/cm$^2$ by means of the high pressure homogenizer (Nanomizer LA-31 manufactured by Nanomizer, Inc.). The measurement result of this dispersion is shown in Table 1.

Example 3

A cationic polymer-modified silica dispersion was obtained in the same manner as in Example 1, except that 60 g of a diallylamine hydrochloride-sulfur dioxide copolymer aqueous solution having a concentration of 20 wt % was used as a cationic polymer. The measurement result of this dispersion is shown in Table 1.

Example 4

A cationic polymer-modified silica dispersion was obtained in the same manner as in Example 1, except that 43 g of a diallyldimethylammonium chloride polymer aqueous solution having a concentration of 28 wt % was used as a cationic polymer. The measurement result of this dispersion is shown in Table 1.

Comparative Example 1

A cationic polymer-modified silica dispersion was obtained in the same manner as in Example 1, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 1.

Comparative Example 2

A cationic polymer-modified silica dispersion was obtained in the same manner as in Example 1, except that the homogenizer (Ultra-Turrax T-25 manufactured by Ika Co., Ltd.) was substituted for the high pressure homogenizer to treat the dispersion for 60 minutes at 20000 rpm. The measurement result of this dispersion is shown in Table 1.

Comparative Example 3

A cationic polymer-modified silica dispersion was obtained in the same manner as in Example 3, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 1.

Comparative Example 4

A cationic polymer-modified silica dispersion was obtained in the same manner as in Example 4, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 1.

Example 5

A reactor was charged with commercial sodium silicate and demineralized water so that a solution having a sodium silicate concentration of 5% was prepared. This solution was heated up to 40° C. and neutralized to a neutralization rate of 50% with 22 wt % sulfuric acid, and then the reaction liquid was heated to a temperature of 95° C. Sulfuric acid described above was added to this reaction liquid until the neutralization rate came up to 100%. Resulting silica was repeatedly subjected to filtration and washing operations to obtain a dewatered cake (silica content: 15 wt %). Silica obtained by drying this dewatered cake had a specific surface area of 280 m$^2$/g.

Added to 800 g of the dewatered cake described above was 200 g of demineralized water, and the dispersion was stirred by means of a propeller mixer to thereby obtain a silica slurry. Added to this silica slurry was 48 g of a diallyldimethylammonium chloride-acrylamide copolymer aqueous solution having a concentration of 25 wt % as a cationic polymer, and the liquid was stirred by means of a propeller mixer to thereby obtain a preliminary mixed liquid. This preliminary mixed liquid was passed through an orifice three times at a treating pressure of 800 kgf/cm$^2$ by means of the high pressure homogenizer (Nanomizer LA-31 manufactured by Nanomizer, Inc.), whereby a cationic polymer-modified silica dispersion was obtained. The measurement result of this dispersion is shown in Table 1.

Comparative Example 5

A cationic polymer-modified silica dispersion was obtained in the same manner as in Example 5, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 1.

TABLE 1

|  | n | Transmission factor (%) | Viscosity (mPa · s) | Particle diameter (nm) | Zeta potential (mV) |
|---|---|---|---|---|---|
| Pulverized silica dispersion (A) | 2.4 | 22 | 10 | 150 | −25 |
| Example 1 | 2.5 | 23 | 50 | 140 | +40 |
| Example 2 | 2.6 | 25 | 50 | 130 | +40 |
| Example 3 | 2.5 | 23 | 100 | 140 | +24 |
| Example 4 | 2.5 | 19 | 53 | 140 | +32 |
| Comparative Example 1 | 1.5 | 4 | 820 | 4000 | +47 |
| Comparative Example 2 | 1.6 | 6 | 700 | 3400 | +47 |
| Comparative Example 3 | 1.7 | 10 | 100 | 2500 | +24 |
| Comparative Example 4 | 0.8 | 2 | 190 | 35000 | +39 |
| Example 5 | 2.4 | 23 | 50 | 150 | +41 |
| Comparative Example 5 | 0.8 | 2 | 850 | 35000 | +47 |

As can be seen from Table 1, any of the cationic polymer-modified silica dispersions prepared in Examples 1 to 5 showed the n values and average particle diameters which were the same as or higher than those of the pulverized silica dispersion (A). On the other hand, any of the cationic polymer-modified silica dispersions prepared in Comparative Examples 1 to 5 had an n value of lower than 2.0 and an average particle diameter of 200 nm or more. Further, the dispersions prepared in Comparative Examples 1 to 5 had a lower transmission factor as compared with those of the dispersions prepared in Examples 1 to 5.

Example 6

Added to 120 g of dry processed silica (Reolosil(r) QS30 manufactured by Tokuyama Corp.) having a specific surface area of 300 m²/g was 880 g of demineralized water, and the dispersion was stirred by means of the homogenizer (Ultra-Turrax T-25 manufactured by Ika Co., Ltd.) to thereby obtain a silica slurry. Added to this silica slurry was 48 g of a diallyldimethylammonium chloride-acrylamide copolymer aqueous solution having a concentration of 25 wt % as a cationic polymer, and the liquid was stirred by means of a propeller mixer to thereby obtain a preliminary mixed liquid. The resulting preliminary mixed liquid was passed through an orifice once at a treating pressure of 800 kgf/cm² by means of the high pressure homogenizer (Nanomizer LA-31 manufactured by Nanomizer, Inc.), whereby a cationic polymer-modified silica dispersion was obtained. The measurement result of this dispersion is shown in Table 2.

Example 7

Added to 200 g of dry processed silica (Reolosil(r) QS30 manufactured by Tokuyama Corp.) having a specific surface area of 300 m²/g was 800 g of demineralized water, and the liquid was stirred by means of the homogenizer (Ultra-Turrax T-25 manufactured by Ika Co., Ltd.) to thereby obtain a silica slurry. Added to this silica slurry was 50 g of a diallylmethylamine hydrochloride polymer aqueous solution having a concentration of 20 wt % as a cationic polymer, and the solution was stirred by means of a propeller mixer to thereby obtain a preliminary mixed liquid. The resulting preliminary mixed liquid was passed through an orifice once at a treating pressure of 800 kgf/cm² by means of the high pressure homogenizer (Nanomizer LA-31 manufactured by Nanomizer, Inc.), whereby a cationic polymer-modified silica dispersion was obtained. The measurement result of this dispersion is shown in Table 2.

Example 8

A cationic polymer-modified silica dispersion was obtained in the same manner as in Example 7, except that 20 g of a polyallylamine hydrochloride polymer aqueous solution having a concentration of 50 wt % was used as a cationic polymer. The measurement result of this dispersion is shown in Table 2.

Example 9

A cationic polymer-modified silica dispersion was obtained in the same manner as in Example 7, except that 20 g of a dilyallyldimethylammonium chloride polymer aqueous solution having a concentration of 50 wt % was used as a cationic polymer. The measurement result of this dispersion is shown in Table 2.

Comparative Example 6

A cationic polymer-modified silica dispersion was obtained in the same manner as in Example 6, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 2.

Comparative Example 7

A cationic polymer-modified silica dispersion was obtained in the same manner as in Example 7, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 2.

Comparative Example 8

A cationic polymer-modified silica dispersion was obtained in the same manner as in Example 8, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 2.

Comparative Example 9

A cationic polymer-modified silica dispersion was obtained in the same manner as in Example 9, except that the homogenizer (Ultra-Turrax T-25 manufactured by Ika Co., Ltd.) was substituted for the high pressure homogenizer to treat the dispersion for 10 minutes at 20000 rpm. The measurement result of this dispersion is shown in Table 2.

TABLE 2

|  | n | Transmission factor (%) | Viscosity (mPa · s) | Particle diameter (nm) | Zeta potential (mV) |
|---|---|---|---|---|---|
| Example 6 | 3.4 | 62 | 220 | 96 | +47 |
| Example 7 | 3.5 | 63 | 50 | 93 | +35 |
| Example 8 | 3.3 | 60 | 20 | 106 | +27 |
| Example 9 | 3.5 | 65 | 130 | 95 | +35 |
| Comparative Example 6 | 2.0 | 39 | 1500 | 53870 | +49 |
| Comparative Example 7 | 2.7 | 39 | 220 | 6450 | +37 |
| Comparative Example 8 | 2.7 | 39 | 140 | 426 | +29 |
| Comparative Example 9 | 2.5 | 31 | 1600 | 11670 | +36 |

As can be seen from Table 2, any of the cationic polymer-modified silica dispersions prepared in Examples 6 to 9 had an average particle diameter of 200 nm or less and an n value of 2.0 or more. On the other hand, any of the cationic polymer-modified silica dispersions prepared in Comparative Examples 6 to 9 had an n value of 2.0 or more but had an average particle diameter of 200 nm or more. Further, the dispersions prepared in Comparative Examples 6 to 9 had a lower transmission factor as compared with those of the dispersions prepared in Examples 6 to 9.

Effect of the Invention

As can be understood from the above explanations, the cationic polymer-modified silica dispersion of the present invention, though the dispersed particles are silica fine particles having an average particle diameter of less than 200 nm, has as good dispersibility as that of a colloidal silica dispersion which is not subjected to treatment of converting to cation and therefore can suitably be used as a raw material of a coating liquid for an ink jet sheet. Further, it can suitably be used as a filler for paper such as newsprint paper.

What is claimed is:

1. A cationic polymer-modified silica dispersion in which silica and a cationic polymer are dispersed in a polar solvent, wherein the silica is selected from wet processed silica and dry processed silica, wherein the silica particles contained in said dispersion have an average particle diameter of less than 200 nm, and wherein said dispersion, when diluted to a solid concentration of 1.5% by weight, has a light index n of 2.0 or more.

2. The cationic polymer-modified silica dispersion as described in claim 1, wherein the silica contained in the dispersion has a concentration of 8 to 50% by weight, and the amount of the cationic polymer is 3 to 50 parts by weight per 100 parts by weight of the silica.

3. The cationic polymer-modified silica dispersion as described in claim 1, wherein the silica is dry processed silica.

4. The cationic polymer-modified silica dispersion as described in claim 1, wherein the cationic polymer is a polymer having a quaternary ammonium salt.

5. The cationic polymer-modified silica dispersion as described in claim 1, wherein the polar solvent is water.

6. A process for producing the cationic polymer-modified silica dispersion as described in claim 1, comprising the step of oppositely-colliding a mixed solution obtained by mixing silica with a cationic polymer in a polar solvent at a treating pressure of 300 kgf/cm$^2$ or more.

7. The process for producing the cationic polymer-modified silica dispersion as described in claim 6, wherein the mixed solution is obtained by mixing the cationic polymer with a silica slurry or a silica dispersion in which silica is dispersed in the polar solvent.

8. The process for producing thee cationic polymer-modified silica dispersion as described in claim 6, wherein the silica contained in the mixed solution has a concentration of 50 wt % or less.

9. The process for producing the cationic polymer-modified silica dispersion as described in claim 6, wherein the treating pressure is 800 kgf/cm$^2$ or more.

10. The process for producing the cationic polymer-modified silica dispersion as described in claim 6, wherein the silica is selected from wet processed silica and dry processed silica.

11. The process for producing the cationic polymer-modified silica dispersion as described in claim 7, wherein the mixed solution is obtained by mixing the cationic polymer with a silica dispersion formed by oppositely-colliding the silica slurry in which silica is dispersed in the polar solvent at a treating pressure of 300 kgf/m$^2$ or more.

12. The process for producing the cationic polymer-modified silica dispersion as described in claim 7, wherein the mixed solution is obtained by mixing the cationic polymer with a silica dispersion formed by passing the silica slurry in which silica is dispersed in the polar solvent through an orifice under a condition that a pressure difference between the inlet side and the outlet side of the orifice is 300 kgf/cm$^2$ or more.

13. A process for producing the cationic polymer-modified silica dispersion as described in claim 1, comprising the step of passing a mixed solution, obtained by mixing silica with a cationic polymer in a polar solvent, through an orifice under a condition that a pressure difference between the inlet side and the outlet side of the orifice is 300 kgf/cm$^2$ or more.

14. The process for producing the cationic polymer-modified silica dispersion as described in claim 13, wherein the mixed solution is obtained by mixing the cationic polymer with a silica slurry or a silica dispersion in which silica is dispersed in the polar solvent.

15. The process for producing the cationic polymer-modified silica dispersion as described in claim 13, wherein silica contained in the mixed solution has a concentration of 50 wt % or less.

16. The process for producing the cationic polymer-modified silica dispersion as described in claim 13, wherein the pressure difference between the inlet side and the outlet side of the orifice is 800 kgf/cm$^2$ or more.

17. The process for producing the cationic polymer-modified silica dispersion as described in claim 13, wherein the silica is selected from wet processed silica and dry processed silica.

18. The process for producing the cationic polymer-modified silica dispersion as described in claim 14, wherein the mixed solution is obtained by mixing the cationic polymer with a silica dispersion formed by oppositely-colliding the silica slurry in which silica is dispersed in the polar solvent at a treating pressure of 300 kgf/cm$^2$ or more.

19. The process for producing the cationic polymer-modified silica dispersion as described in claim 14, wherein the mixed solution is obtained by mixing the cationic polymer with a silica dispersion formed by passing the silica slurry in which silica is dispersed in the polar solvent through an orifice under a condition that a pressure difference between the inlet side and the outlet side of the orifice is 300 kgf/cm$^2$ or more.

20. A cationic polymer-modified silica dispersion in which silica and a cationic polymer are dispersed in a polar solvent, wherein the silica is selected from wet processed silica and dry processed silica, wherein the silica particles contained in said dispersion have been obtained by homogenization under a pressure of 300 kgf/cm$^2$ or more, and have an average particle diameter of less than 200 nm, and wherein said dispersion, when diluted to a solid concentration of 1.5% by weight, has a light scattering index n of 2.0 or more.

* * * * *